(12) United States Patent
Kang (10) Patent No.: US 7,327,999 B2
(45) Date of Patent: Feb. 5, 2008

(54) APPARATUS AND METHOD FOR MANAGING SMS MESSAGES IN HHP

(75) Inventor: Dong-seok Kang, Yongin-si (KR)

(73) Assignee: Samsung Electronics Co., Ltd., Suwon (KR)

(*) Notice: Subject to any disclaimer, the term of this patent is extended or adjusted under 35 U.S.C. 154(b) by 450 days.

(21) Appl. No.: 10/189,782

(22) Filed: Jul. 8, 2002

(65) Prior Publication Data

US 2003/0022678 A1    Jan. 30, 2003

(30) Foreign Application Priority Data

Jul. 10, 2001    (KR) .............................. 2001-41214

(51) Int. Cl.
*H04M 11/00*    (2006.01)
(52) U.S. Cl. .................. 455/406; 455/466; 455/407; 705/40; 705/41; 705/39; 705/26
(58) Field of Classification Search ................ 455/466, 455/406, 407, 408, 412.1, 412.2, 414.1, 414.2, 455/414.3; 379/114.01, 114.03, 114.17, 379/114.28, 130; 370/349; 707/3, 4; 705/40, 705/41, 26, 39
See application file for complete search history.

(56) References Cited

U.S. PATENT DOCUMENTS

| | | | | |
|---|---|---|---|---|
| 5,684,861 A * | 11/1997 | Lewis et al. | ................. | 455/405 |
| 5,687,216 A * | 11/1997 | Svensson | ................. | 455/412.2 |
| 6,430,406 B1 * | 8/2002 | Frisk | ........................... | 455/407 |
| 6,647,272 B1 * | 11/2003 | Asikainen | ................... | 455/466 |
| 6,807,410 B1 * | 10/2004 | Pailles et al. | ................ | 455/407 |
| 6,868,391 B1 * | 3/2005 | Hultgren | ....................... | 705/26 |
| 2001/0037264 A1 * | 11/2001 | Husemann et al. | ........... | 705/26 |
| 2002/0073027 A1 * | 6/2002 | Hui et al. | ...................... | 705/40 |

FOREIGN PATENT DOCUMENTS

| | | |
|---|---|---|
| EP | 1 056 269 A1 * | 11/2000 |
| JP | 5-167507 | 7/1993 |
| JP | 7-13981 | 1/1995 |
| JP | 07-13981 | 1/1995 |
| JP | 7-319667 | 12/1995 |
| JP | 8-50620 | 2/1996 |
| JP | 08-050620 | 2/1996 |
| JP | 10-198739 | 7/1998 |
| JP | 2000-287241 | 10/2000 |
| JP | 2000-339353 | 12/2000 |
| JP | 2000-353281 | 12/2000 |
| JP | 2001-22789 | 1/2001 |
| JP | 2001-134644 | 5/2001 |
| JP | 2001-157013 | 6/2001 |

* cited by examiner

*Primary Examiner*—Joseph Feild
*Assistant Examiner*—Randy Peaches
(74) *Attorney, Agent, or Firm*—Sughrue Mion, Pllc.

(57) ABSTRACT

There are provided an apparatus and a method of managing short message service (SMS) messages related to the settlement of payments using a hand-held phone. The apparatus includes a message receiver, a settlement-related SMS message manager, and a message displayer. The message receiver receives and stores SMS messages. The settlement-related SMS message manager searches settlement-related SMS messages of the SMS messages based on attribute data of the SMS messages to create settlement-related statistical data. The message displayer displays the settlement-related statistical data to the outside. Users can conveniently manage data on payments to be settled and receives statistically analyzed settlement-related data as settlement-related SMS messages can be managed in a HHP.

8 Claims, 7 Drawing Sheets

TELESERVICE LAYER

| MESSAGE IDENTIFIER | USER DATA | MC TIME STAMP | PRIORITY IDENTIFIER | PRIVACY INDICATOR | ALERT ON DELIVERY | LANGUAGE INDICATOR |
|---|---|---|---|---|---|---|

TRANSPORT LAYER

| SMS_MSG_TYPE | TELESERVICE IDENTIFIER | ORIGINATING ADDRESS | BEARER REPLY OPTION | BEARER DATA |
|---|---|---|---|---|

RELAY LAYER

| UM REFERENCE INTERFACE |
|---|

LINK LAYER (IS-95-A)

| MSG_TYPE | ACK SEQ | MSG SEQ | ... | NUM FIELDS | CHARI | RESERVED |
|---|---|---|---|---|---|---|

FIG. 3

| DATA ON SETTLEMENT TIME | DATA ON PLACES OF SETTLED PAYMENTS | DATA ON AMOUNT OF PAYMENTS FOR SETTLEMENT | DATA ON TICKETS TO BE PURCHASED | ... |
|---|---|---|---|---|

APPARATUS AND METHOD FOR MANAGING SMS MESSAGES IN HHP

BACKGROUND OF THE INVENTION

1. Field of the Invention

The present invention relates to an apparatus and a method of managing short message service (SMS) messages related to the settlement of payments using a hand-held phone (HHP).

2. Description of the Related Art

Currently, services for settling payments using HHPs are appearing. Since this service for settling payments has been developed, users can easily use this service and settle payments through the use of their portable HHPs Thus, the users are attracted to places selling mobile devices and service Most settlement systems using HHPs concentrate on the settlement of a small sum, such as costs for purchases on the Internet For the settlement of payments via HHPs, charged contents are provided after a user's portable phone number and social security number are confirmed, and payment of the contents is charged with phone rates of the portable phone number. Here, information on the authentication of a user's status and the settlement results are transmitted using SMS. In other words, a purchaser receives settlement information in the form of an SMS message via HHP. However, a mixture of SMS messages related to settlements and other general SMS messages are received and stored together in the HHP, consequently creating inconvenience for the purchaser with regard to management of settlement-related SMS messages since the HHP does not provide a function for managing the settlement-related SMS messages. As a result, an additional problem results in which statistical information on the payment for the settlement, such as the sum of purchases made, must be determined manually.

SUMMARY OF THE INVENTION

To solve the above-described problems, it is an object of the present invention to provide an apparatus and a method of managing SMS messages in a HHP.

Accordingly, to achieve the above object, there is provided an apparatus for managing SMS messages related to the settlement of payments in a hand held phone (HHP) receiving SMS messages. The apparatus includes a message receiver, a settlement-related SMS message manager, and a message displayer. The message receiver receives and stores SMS messages. The settlement-related SMS message manager searches settlement-related SMS messages of the SMS messages based on attribute data of the SMS messages to create settlement-related statistical data. The message displayer displays the settlement-related statistical data to the outside. The SMS messages includes settlement-related data having at least one of data on settlement time, data on settled payment spending places, and data on the amount of settled payments in User Data in Teleservice Layer. The attribute data of the SMS messages is distinguished from general SMS messages by assigning a predetermined value to Message Identifier in the Teleservice Layer, and the settlement-related SMS message manager determines whether or not the SMS messages are settlement-related SMS messages based on the value assigned to the Message Identifier. The settlement-related statistical data includes any one of data on the amount of settled payments for each of period of times and data on the amount of settled payments of each of spending places of the settlement-related SMS messages.

To achieve the above object, there is provided a method of managing SMS messages related to the settlement of payments in a HHP receiving SMS messages. SMS messages are received and the SMS messages are stored in database. Conditions for searching settlement-related SMS messages are received from a user. Settlement-related SMS messages are extracted from the database based on attribute data of the stored SMS messages. Reference data is created using settlement-related SMS messages, which correspond with the searching conditions, of the settlement-related SMS messages. Displaying the reference data is displayed to a user When receiving the conditions for searching settlement-related SMS messages from the user, conditions for a statistical analysis are further received. When creating reference data, statistically analyzed data of, settlement-related SMS messages, which correspond with the searching conditions, of the settlement-related messages, is further created based on the conditions of the statistical analysis. When displaying the reference data to the user, the statistically analyzed data is further displayed to the user.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the present invention will be described in detail with reference to the attached drawings.

Figure 1:
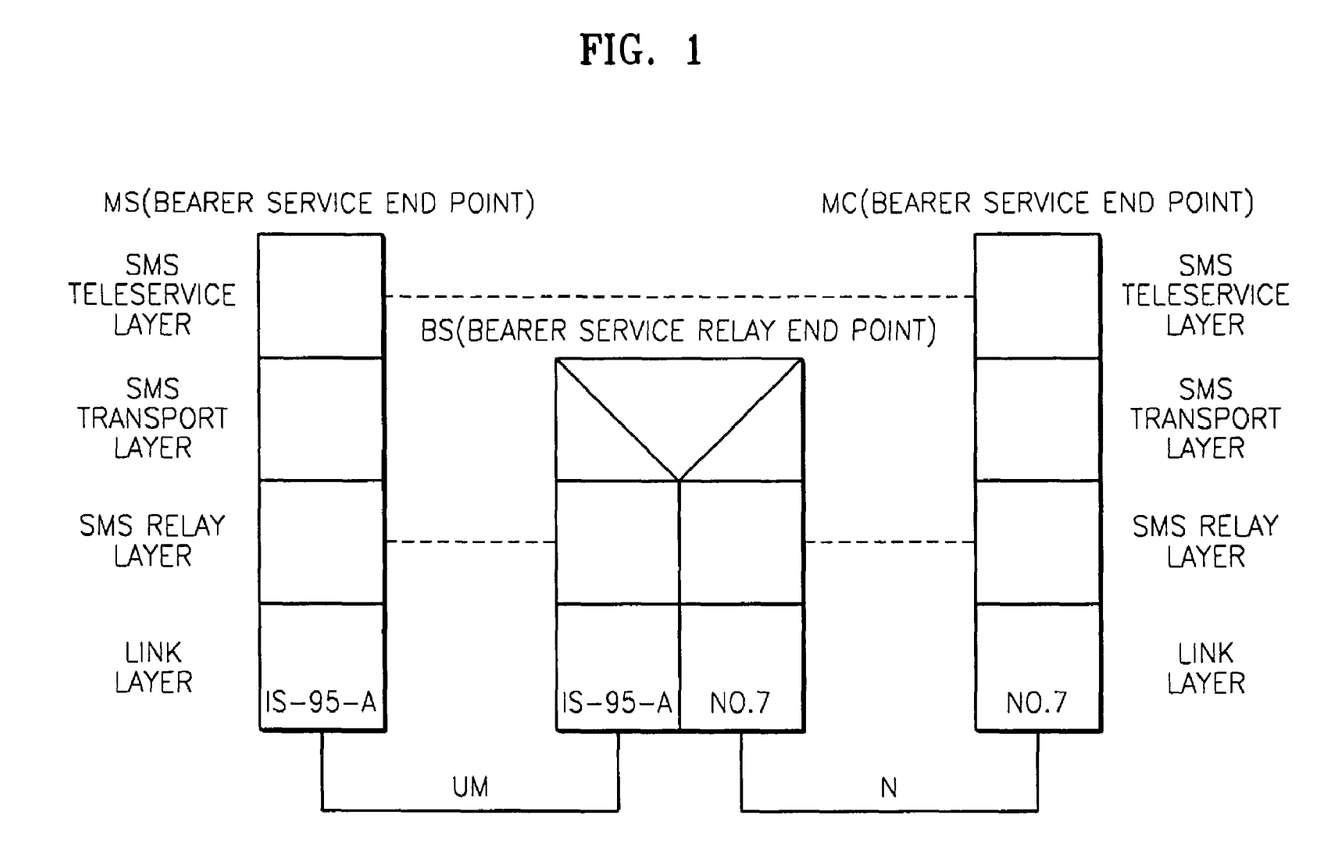
FIG. 1 is a diagram of an SMS protocol stack.

FIG. 1 shows a SMS protocol stack. SMS messages are formed based on Data Burst Message, i.e., Link Layer, of IS-95-A, and SMS messages are generally transmitted up to about 100 characters of the Korean alphabet in length, i.e., does not exceed the maximum 200 Bytes. As shown in FIG. 1, Link Layer sets Data Burst Message and Relay layer sets a transmission channel based on the state of a HHP and the length of messages. Transport Layer forms MC for transceiving messages and end points between HHPs, and constitutes messages in the HHP by receiving Bearer Data from Teleservice Layer. Teleservice Layer supports a basic SMS function using a standardized Subparameter of Short Message Data Parameter.

Figure 2:
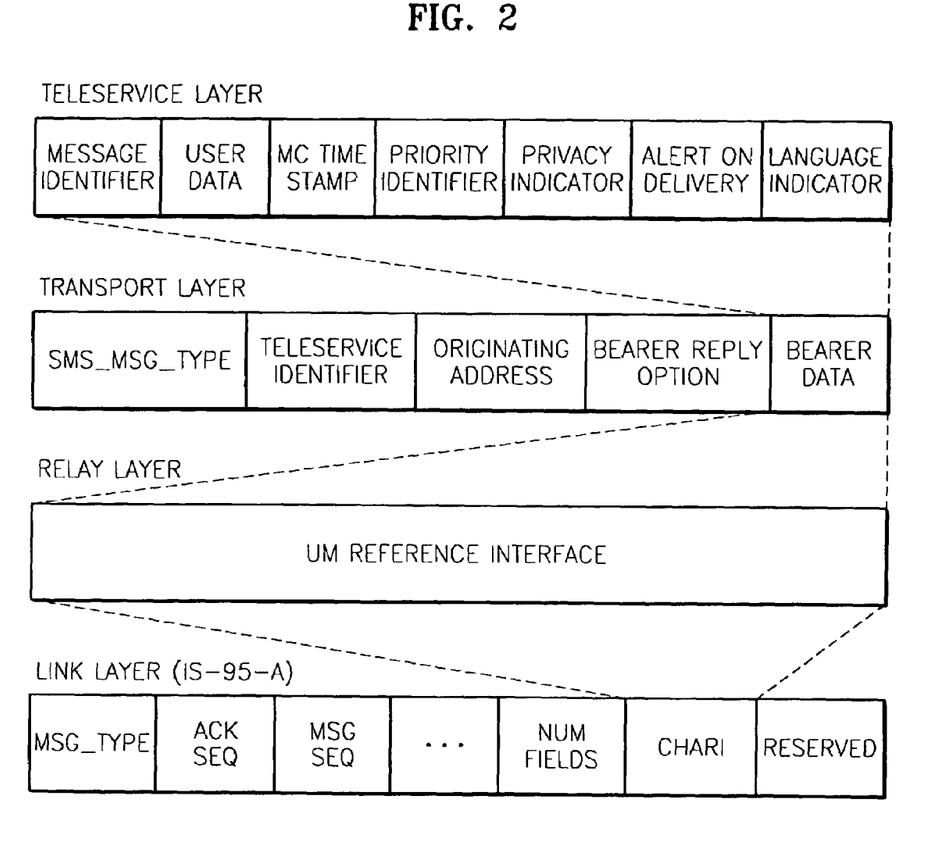
FIG. 2 is a diagram of the layer structure of IS-637.

FIG. 2 shows the layer structure of IS-637. The structure of messages in each of Layers for carrying out SMS is shown in FIG. 2. The SMS parameter of CHARI message of Data Burst Message is capsulated, and Link Layer analyses and transmits the capsulated SMS parameter to a higher rank Also, Transport Message is formed through UM Reference Interface in Relay Layer based on the Burst Message in the Link Layer. Transport Layer messages include Teleservice Identifier such as vocal message box or general messages and Bearer Data such originating address (or senders' numbers) and bearer replay option. The Bearer Data forms Teleservice Layer, which provides application services. The Teleservice Layer is composed of User Data containing the contents of received messages, MC Time Stamp, Priority Identifier, Privacy Indicator, Alert on Delivery, and Language Indicator.

Figure 3:
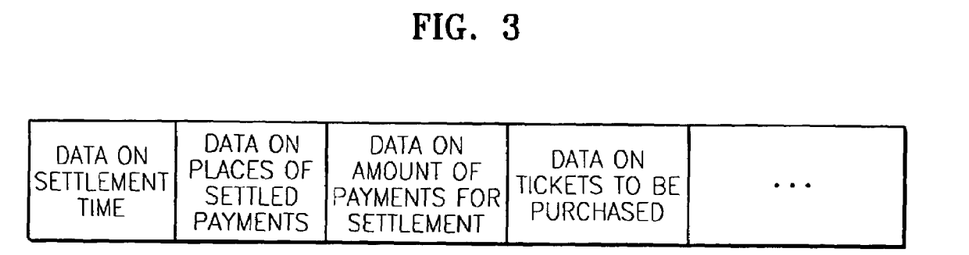
FIG. 3 is a diagram of the data structure of a user table shown in FIG. 2.

In the present invention, when settlement-related SMS messages are sent, a new value is assigned to Teleservice Identifier and the settlement-related SMS messages are managed to be distinguished from general messages based on the new value. Also, settlement-related data may be assigned to the User Data in regular order and managed. This is shown in FIG. 3

As described previously, FIG. 3 shows the data configuration of the User Data shown in FIG. 2. The User Data may include data on settlement time, places of settled payment, and the amount of the payments for the settlement, tickets to be purchased and the like, which are used as basic statistical materials of data on settlement of the present invention. Here, special letters, e.g., Tab (Ox09), CR (carriage return: Ox0d), and the like, are added after data to distinguish each of data.

Figure 4:
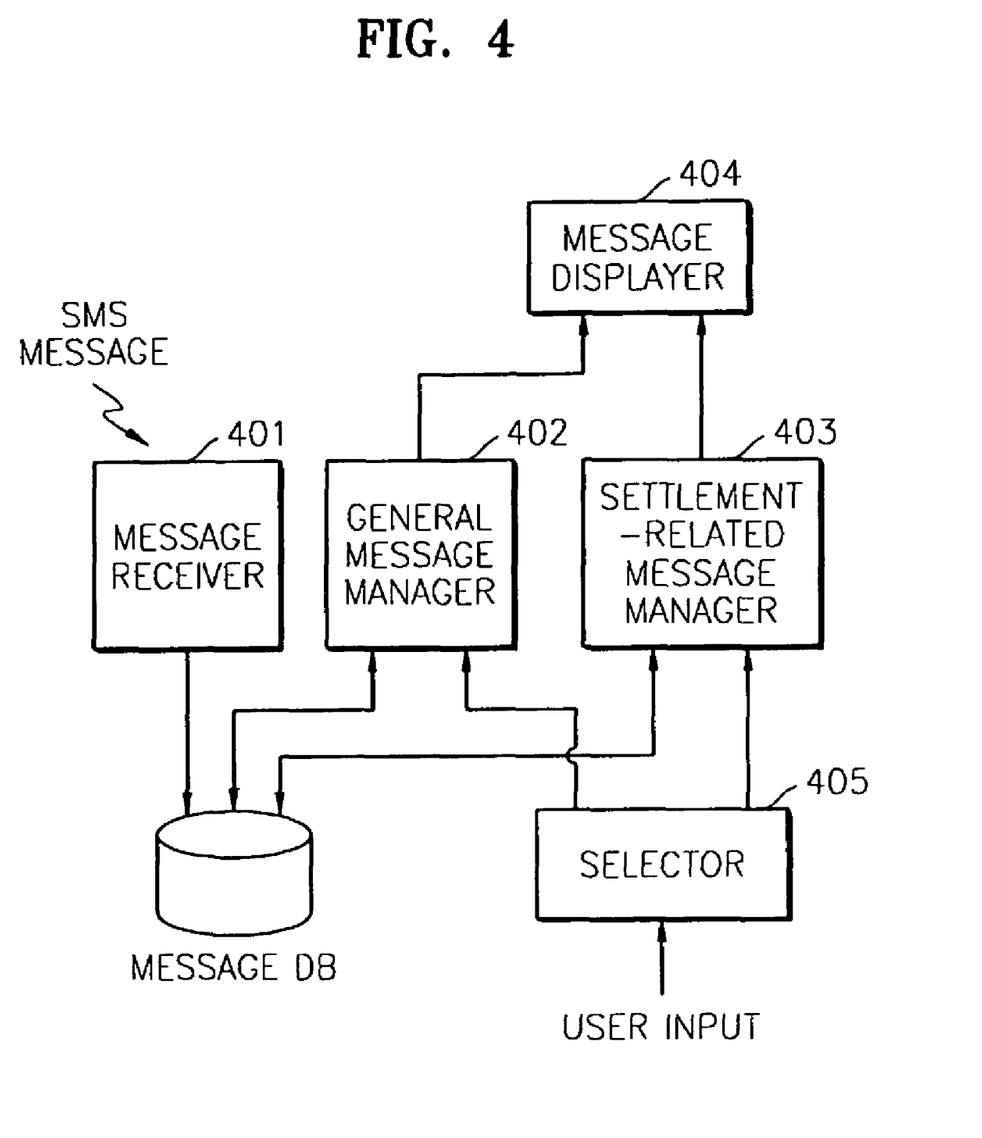
FIG. 4 is a diagram of an apparatus for managing short message service (SMS) messages related to the settlement of payments in a hand-held phone (HHP)
Figure 5:
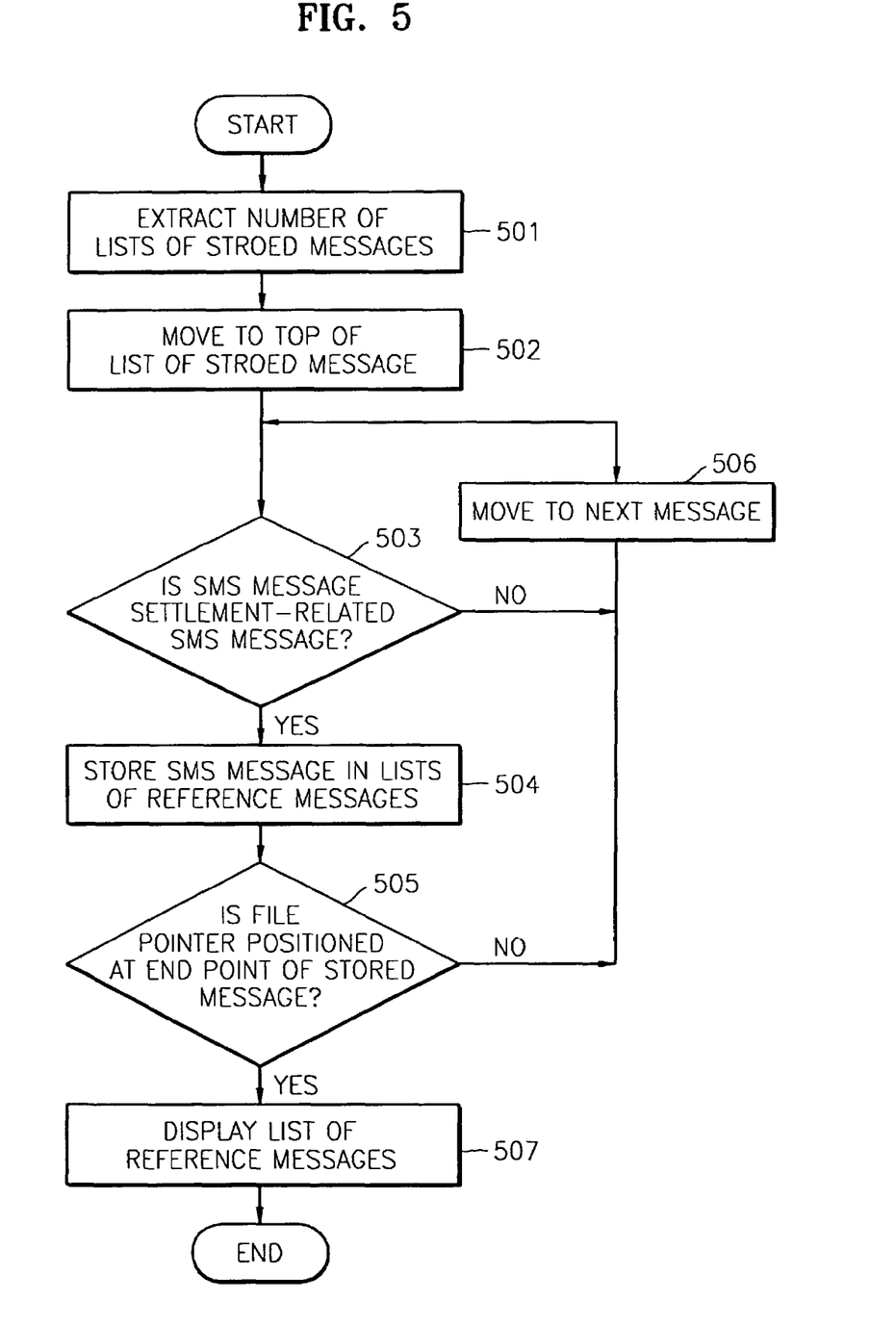
FIG. 5 is a flowchart referring to a list of settlement-related SMS messages.

FIG. 4 shows an apparatus for managing SMS messages related to the settlement of payments in a HHP. A message receiver 401 receives and stores SMS messages, which are transmitted from a communications company. A general message manager 402 reads and forwards the SMS messages stored in the message receiver 401 to a message displayer 404. Here, only general SMS messages may be received, stored, and forwarded except settlement-related SMS messages. A settlement-related message manager 403 reads and forwards only settlement-related SMS messages of the SMS messages in the message receiver 401 to the message displayer 404. Here, the settlement massage manager 403 may create and forward statistically analysed settlement-related data of the settlement-related SMS messages to the message displayer 404 according to a user's need. The message displayer 404 receives data from the general message manager 402 or the settlement-related message manager 403 and displays it to users. A selector 405 receives data on whether users want to see the general SMS messages, settlement-related SMS messages, or the statistically analysed settlement-related data and forwards the data to the general message manager 402 or the settlement-related message manager 403. Here, the statistically analysed settlement-related data represents data on the sum and average of settled payments and the sum and average of the payments of each of spending places for predetermined periods of times FIG. 5 is a flowchart of referring to a list of settlement-related SMS messages. The number of stored messages is extracted in step 501. In step 502, the file pointer moves to the top of a list of the stored messages. One SMS message is read and determined whether or not it is a settlement-related SMS message in step 503. Here, if the read SMS message is a settlement-related SMS message, it is stored in a list of reference messages in step 504. In step 505, it is determined whether or not the file pointer is positioned at the end point of the extracted message. The file pointer moves to a next message if it is not positioned at the end point of the extracted message in step 506 and step 503 restarts. If the SMS message read is not a settlement-related SMS message in step 503, step 506 restarts. If the file pointer is positioned at the end point of the extracted message in step 505, a list of reference messages is displayed to a user in step 507.

Figure 6:
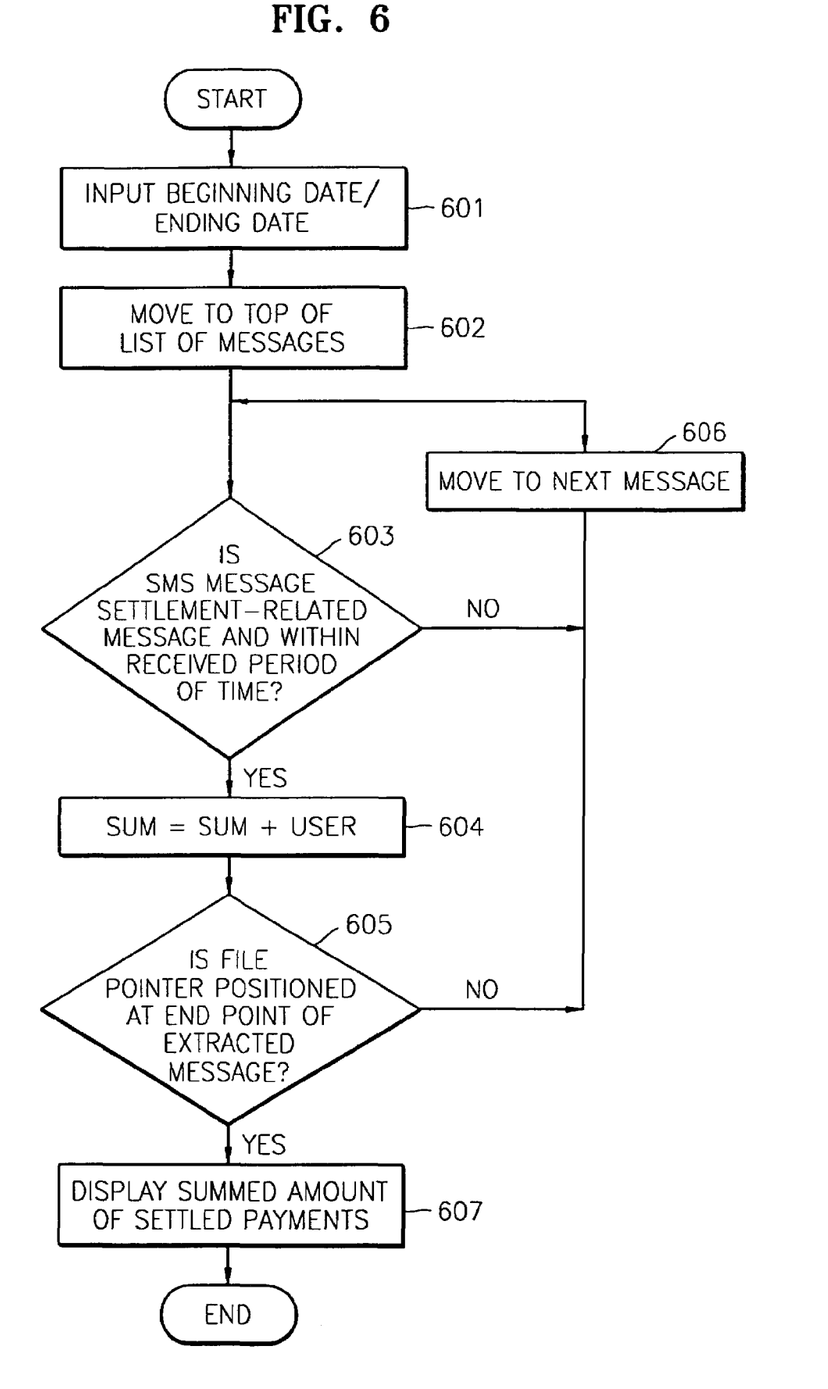
FIG. 6 is a flowchart summing/searching the payments for the settlement for each of periods of times.

FIG. 6 is a flowchart of summing/searching payments settled for each of predetermined periods of times The beginning date and ending date of a period of time for summing or searching the payments are received in step 601. The number of stored messages is extracted and the file pointer moves to the top of a list of stored messages in step 602. A SMS message is read and it is determined whether or not the SMS message is a settlement-related SMS message and is within the received period of time in step 603. Here, if the SMS message is a settlement-related SMS message and is within the received period of time, the amount of settled payments is summed in step 604. It is determined whether or not the file pointer is positioned at the end point of the extracted message in step 605. If the file pointer is not positioned at the end point of the extracted message, the file pointer moves to a next message in step 606 and step 603 restarts. If the SMS message is not a settlement-related SMS message in step 603, or is not within the received period of time, step 606 restarts. If the file pointer is positioned at the end point of the extracted message in step 605, the summed amount of the settled payments is displayed to a user in step 607.

Figure 7:
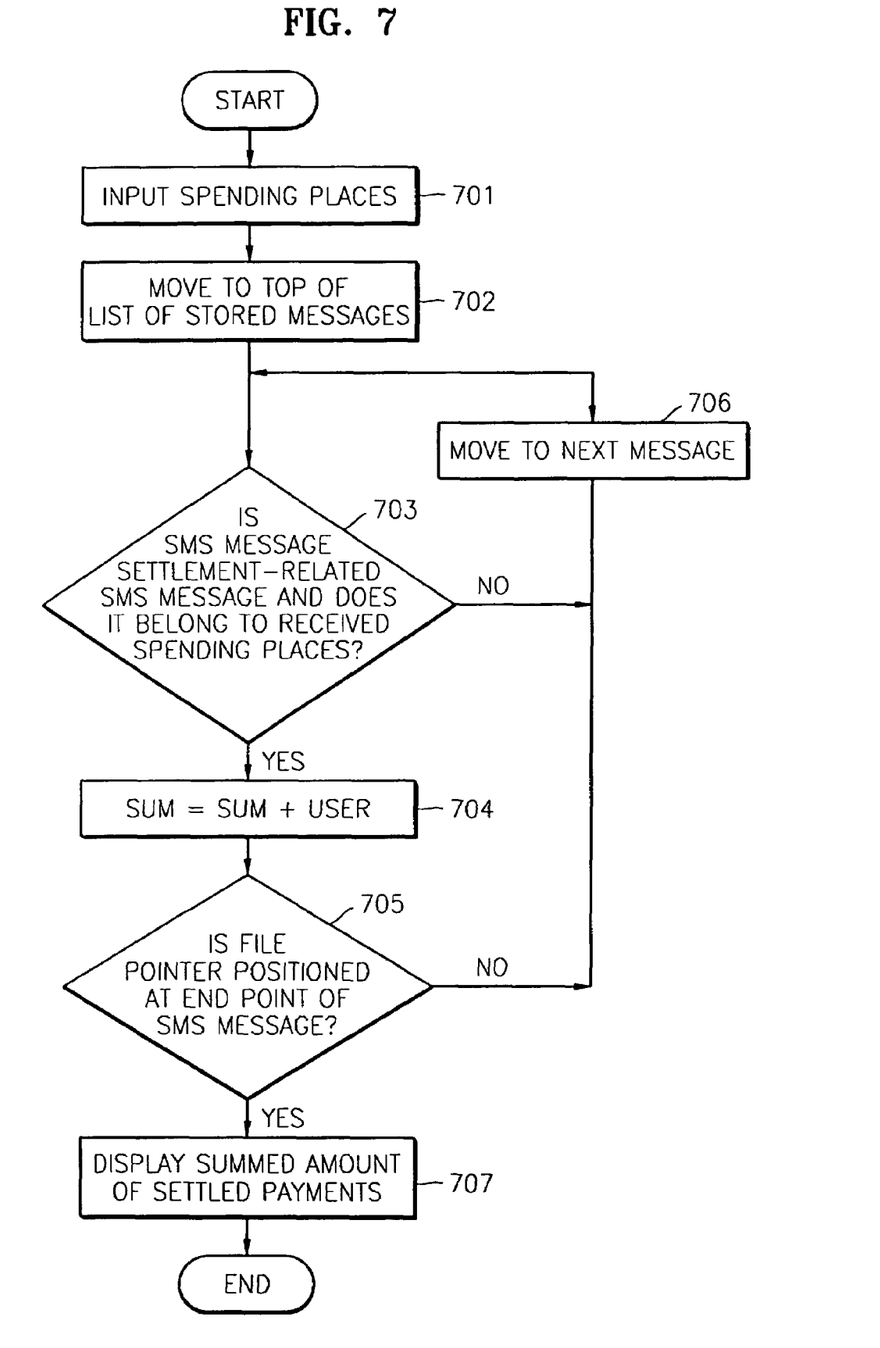
FIG. 7 is a flowchart of summing/searching the payments for the settlement of each place of payment.

FIG. 7 is a flowchart of summing/searching settled payments of each of spending places. Spending places for summing and searching the settled payments are received in step 701. The number of stored messages is extracted and the file pointer moves to the top of a list of the stored messages in step 702. A SMS message is read and it is determined whether or not the SMS message is a settlement-related SMS message and belongs to the received spending place in step 703. Here, if the SMS message is a settlement-related SMS message and belongs to the received spending place, the amount of settled payments is summed in step 704 It is determined whether or not the file pointer is positioned at the end point of the extracted message in step 705 If the file pointer is not positioned at the end point of the extracted message, the pointer moves to a next message in step 706 and step 703 restarts. If the SMS message is not a settlement-related SMS message in step 703, or does not belong to the received spending place, step 706 restarts. If the file pointer is positioned at the end point of the extracted message in step 705, the summed amount of the settled payments is displayed to a user in step 707.

Figure 8:
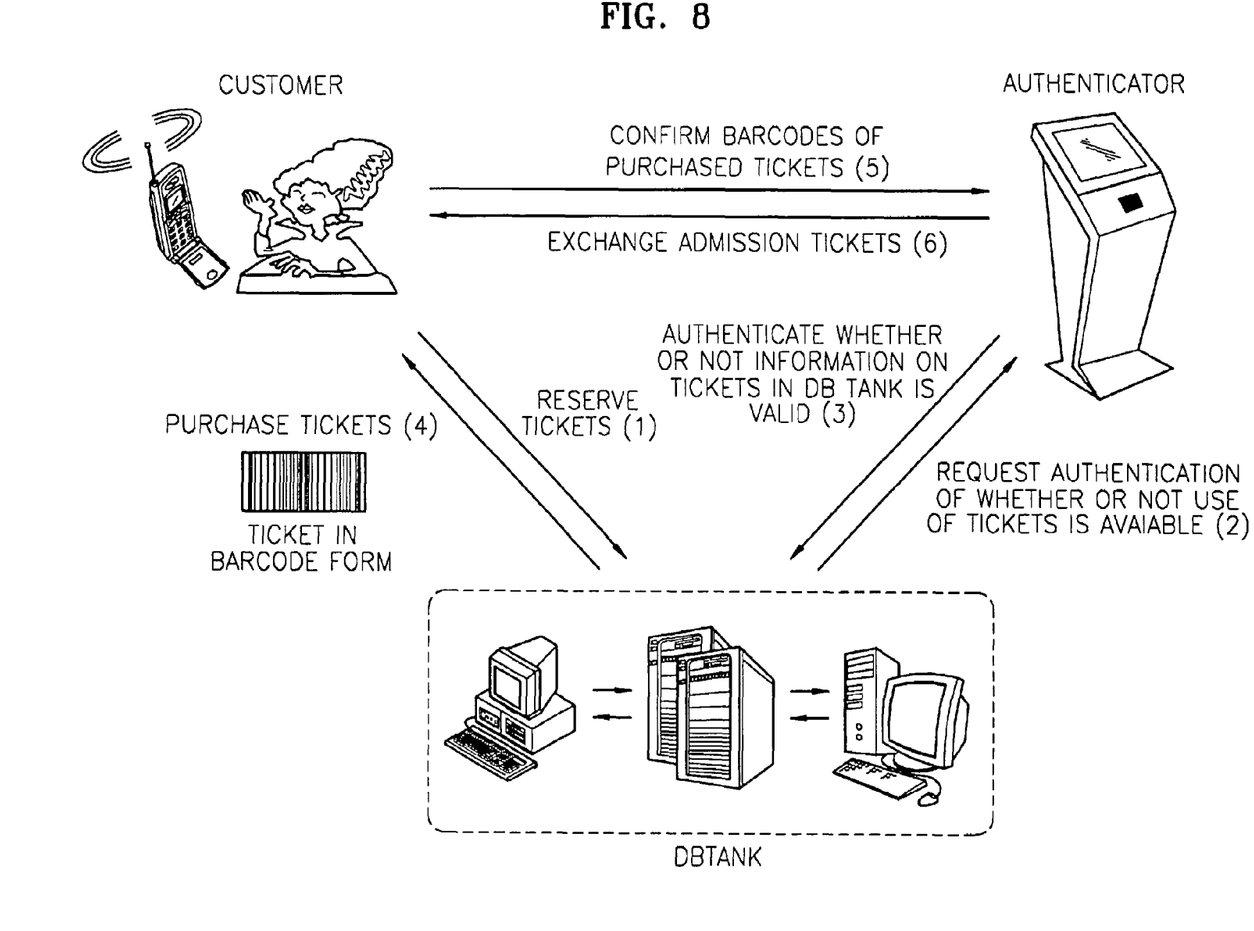
FIG. 8 is a diagram of a function for managing tickets to be purchased in a HHP.

FIG. 8 shows an example of managing tickets to be purchased in a HHP. A customer is connected to a DBTANK, which is a computer for selling tickets in a communication network, to reserve tickets (1) via a HHP. The DBTANK requests the authentication of whether or not the use of the tickets is available (2). An authenticator authenticates whether or not information on the tickets in the DBTANK is valid (3). The DBTANK, which receives the authentication of the tickets from the authenticator, transmits information on the tickets in the barcode form to the customer's HHP (4). The customer presents the tickets in the barcode form to the authenticator (5) and exchanges admission tickets or various goods (6). In this case, settlement-related data of settlement-related SMS messages received and stored in a HHP may include information on the tickets in the barcode form.

A HHP may include the following menu to manage settlement-related SMS messages.

1. Basic Functions
    (1) Reference to settlement-related information—A function of showing a list of settlement-related SMS messages and the contents of the settlement-related SMS messages.
    (2) Shopping Cart—A function of managing tickets to be purchased as described with reference to FIG. 8.
    (3) Summing/searching—A function of summing/searching the amount of settled payments for each of period of times/spending places.
    (4) Information Deletion—A function of automatically deleting unnecessary information and SMS messages stored for a predetermined period of time.
2. Function of Managing Personal Identification Number—A Function of Setting, Changing, and Cancelling Personal Identification Numbers.

The above-described embodiments of the present invention may be written as programs to be executed in computers. Also, the embodiments may be realized in general-purpose digital computers for operating the programs using media used in computers. The media includes magnetic storage media, e.g., ROMs, floppy disks, hard disks, and the like, and optical reading media, e.g., CD ROMs, DVDs, and the like.

As described above, according to the present invention, users can conveniently manage data on payments to be settled and receives statistically analysed settlement-related data as settlement-related SMS messages can be managed in a HHP Also, if the data configuration described with reference to FIG. 3 is used, the capacity occupied by SMS messages can be reduced. Thus, many more messages can be stored. As described with reference to FIG. 8, tickets to be purchased can conveniently be managed using a HHP. Thus, electronic business transactions can briskly be carried.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for managing SMS messages related to the settlement of payments in a hand held phone (HHP) receiving SMS messages comprising:
    a memory;
    a message receiver for receiving and storing SMS messages in the memory;
    a settlement-related SMS message manager for searching for settlement-related SMS messages among the SMS messages stored in the memory based on attribute data of the SMS messages, and creating settlement-related statistical data based on results of the searching; and
    a message displayer for displaying the settlement-related statistical data.

2. The apparatus of claim 1, wherein the SMS messages comprise settlement-related data including at least one of data on settlement time, data on settled payment spending places, and data on the amount of settled payments in User Data in a Teleservice Layer.

3. The apparatus of claim 1, wherein the attribute data of the SMS messages is distinguished from general SMS messages by assigning a predetermined value to a Message Identifier in a Teleservice Layer, and the settlement-related SMS message manager determines whether or not the SMS messages are settlement-related SMS messages based on the value assigned to the Message Identifier.

4. The apparatus of claim 1, wherein the settlement-related statistical data comprises any one of data on the amount of settled payments for each of period of times and data on the amount of settled payments of each of spending places of the settlement-related SMS messages.

5. A method of managing SMS messages related to the settlement of payments in a hand held phone (HHP) receiving SMS messages comprising:
    (a) receiving SMS messages and storing the SMS messages in a database,
    (b) receiving from a user conditions for searching settlement-related SMS messages among the SMS messages stored in the database;
    (c) extracting settlement-related SMS messages from the database based on attribute data of the SMS messages stored in the database;
    (d) creating reference data using settlement-related SMS messages, which correspond with the searching conditions, of the settlement-related SMS messages which are extracted; and
    (e) displaying the reference data to a user.

6. The method of claim 5, wherein in the step (b), conditions for a statistical analysis are further received, in the step (d), statistically analyzed data of, settlement-related SMS messages, which correspond with the searching conditions, of the settlement-related messages, is created based on the conditions of the statistical analysis, and in the step (e), the statistically analyzed data is displayed to the user.

7. The method of claim 6, wherein the statistically analyzed data comprises any one of data on the amount of settled payments for each of period of times and data on the amount of settled payments of each of spending places of the settlement-related SMS messages.

8. A tangible computer-readable recording medium for recording programs for executing a method described with reference to any one of claims 5 through 7 on a computer.

* * * * *